United States Patent
Hirth et al.

(10) Patent No.: US 8,651,522 B2
(45) Date of Patent: Feb. 18, 2014

(54) AIRBAG, IN PARTICULAR FOR A MOTOR VEHICLE

(75) Inventors: Andreas Hirth, Dielheim (DE); Lutz Quarg, Boeblingen (DE); Friedrich Reiter, Sindelfingen (DE); Clark Ruedebusch, Holzgerlingen (DE)

(73) Assignee: Daimler AG, Stuttgart (DE)

( * ) Notice: Subject to any disclaimer, the term of this patent is extended or adjusted under 35 U.S.C. 154(b) by 456 days.

(21) Appl. No.: 12/740,768

(22) PCT Filed: Sep. 25, 2008

(86) PCT No.: PCT/EP2008/008124
§ 371 (c)(1),
(2), (4) Date: Oct. 26, 2010

(87) PCT Pub. No.: WO2009/056202
PCT Pub. Date: May 7, 2009

(65) Prior Publication Data
US 2011/0049846 A1 Mar. 3, 2011

(30) Foreign Application Priority Data
Nov. 2, 2007 (DE) .......... 10 2007 052 246

(51) Int. Cl.
*B60R 21/231* (2011.01)
(52) U.S. Cl.
USPC ............ 280/743.1; 280/729; 280/743.2
(58) Field of Classification Search
USPC ........... 280/728.1, 729, 732, 736, 742, 743.1
See application file for complete search history.

(56) References Cited

U.S. PATENT DOCUMENTS

| | | | | |
|---|---|---|---|---|
| 3,675,942 A | * | 7/1972 | Huber | 280/738 |
| 3,843,150 A | * | 10/1974 | Harada et al. | 280/729 |
| 3,907,327 A | * | 9/1975 | Pech | 280/729 |
| 3,960,386 A | * | 6/1976 | Wallsten | 280/731 |
| 3,970,328 A | | 7/1976 | Wallsten | |
| 4,500,114 A | * | 2/1985 | Grey, Jr. | 280/742 |
| 5,282,646 A | | 2/1994 | Melvin et al. | |
| 5,338,061 A | * | 8/1994 | Nelson et al. | 280/729 |
| 5,520,413 A | * | 5/1996 | Mossi et al. | 280/729 |
| 5,599,041 A | | 2/1997 | Turnbull et al. | |
| 7,448,644 B2 | * | 11/2008 | Zhong et al. | 280/729 |

(Continued)

FOREIGN PATENT DOCUMENTS

| | | |
|---|---|---|
| DE | 21 58 341 A | 5/1972 |
| DE | 2 302 737 A | 8/1973 |

(Continued)

OTHER PUBLICATIONS

International Search Report dated Dec. 29, 2008 with English translation (Six (6) pages).

(Continued)

*Primary Examiner* — Ruth Ilan
*Assistant Examiner* — Timothy Wilhelm
(74) *Attorney, Agent, or Firm* — Crowell & Moring LLP

(57) ABSTRACT

An airbag for a motor vehicle, comprises a support structure that can be displaced from a storage position to a restraint position, and a covering which surrounds a restraint volume of the airbag formed by the support structure in its restraint position. At least one connecting element, which extends inside the restraint volume, connects together the hollow bodies of the support structure and/or the surface areas of the covering.

2 Claims, 5 Drawing Sheets

(56) References Cited

U.S. PATENT DOCUMENTS

| | | |
|---|---|---|
| 2004/0155440 A1 | 8/2004 | Hasebe et al. |
| 2005/0035578 A1 | 2/2005 | Arwood |
| 2005/0206143 A1 | 9/2005 | Webber |

FOREIGN PATENT DOCUMENTS

| | | |
|---|---|---|
| DE | 694 07 069 T2 | 3/1998 |
| DE | 10 2004 011 369 A1 | 10/2005 |
| DE | 10 2006 038 125 A1 | 2/2008 |
| JP | 2007-106376 A | 4/2007 |
| WO | WO 2007/045952 A1 | 4/2007 |

OTHER PUBLICATIONS

PCT/ISA/237 (Seven (7) pages).

German language Office Action dated Nov. 8, 2010 (Five (5) pages).

\* cited by examiner

AIRBAG, IN PARTICULAR FOR A MOTOR VEHICLE

BACKGROUND AND SUMMARY OF THE INVENTION

This application is a national stage of PCT International Application No. PCT/EP2008/008124, filed Sep. 25, 2008, which claims priority under 35 U.S.C. §119 to German Patent Application No. 10 2007 052 246.2, filed Nov. 2, 2007, the entire disclosure of which is herein expressly incorporated by reference.

The invention relates to an airbag safety restraint system for a motor vehicle.

Such airbags are known from the series-production of passenger motor vehicles. A main problem during the development of these airbags is to ensure maximum protection of vehicle occupants in the case of a collision of the motor vehicle, even if the passenger is for example in a poor seating position. The so-called "OoP" behavior (out of position) of the airbag in its restraint position has a great importance in such a poor seating position.

A further point which has to be considered during the development of such an airbag is avoidance to an injury of the passenger of the motor vehicle by the deployment or enlarging of the airbag itself. It is important for this that the airbag has an advantageous, so-called LRD behavior (low risk deployment).

It is thus one object of the present invention to create an airbag of the type mentioned at the outset, which achieves even better protection for the seat occupant, or which has an improved OoP behavior or LRD behavior.

This object is achieved according to the invention, by an airbag with a support structure that is displaced from a storage position to a restraint position in a mechanical manner or by means of a gas flow. A restraint volume of the airbag formed by the support structure in its restraint position is surrounded by a covering according to the invention. A characteristic of the present airbag is that at least one connection element is provided, which extends within the restraint volume, by means of which element respective components of the support structure and/or surface areas of the covering are connected to each other.

In other words, it is provided according to the invention to use an airbag which comprises a deploying support structure consisting of a plurality of hollow bodies, which are deployed by means of a gas flow, or consisting of a plurality of mechanical components.

The space which is then formed in the restraint position by the support structure—the restraint volume—is given by a covering, which can be filled either with ambient air or also with a pressurized gas. In other words, the deployment of the airbag is presently achieved by the support structure, which is enlarged by means of a corresponding gas or in a mechanical manner. The hollow bodies or the mechanical components are thereby connected to each other to a frame or a framework or the like.

If a seat occupant of a passenger motor vehicle now impacts the airbag in the course of an accident scenario, a restraint effect which is as good as possible shall be achieved. Especially, if ambient air is enclosed by the support structure or the associated covering, the restraint effect is optimized according to the invention in that the at least one connection element extending within the restraint volume is provided, which is connected to the support structure and/or the covering. This is especially important, as, at the time of the impact of the occupant on the restraint volume, its inner pressure is in principle rather lower than with conventional airbags. The inner pressure for the restraint is mainly generated by the impacting passenger himself when dislocating forward. It is thereby particularly important that this pressure build-up for the restraint takes place as efficiently as possible. This takes place according to the invention by a connection element, through which for example an uncontrolled moving away of the support structure or of the restraint volume is prevented in a reliable manner, so that the complete restraint function can be ensured.

In a further arrangement of the invention, it has additionally been shown to be advantageous if the at least one connection element extends transversely to a main deployment direction of the airbag between lateral regions of the airbag. It is especially possible in this manner to reduce a bulging of the airbag during the charge and to prevent a lateral evasion. This lateral evasion namely does not contribute to the restraint, but reduces the pressure build-up within the covering which is effective for the restraint. It is apparent that the described advantages result not only with a support structure which can be deployed with gas, but also with a mechanical solution.

An especially good restraint can be realized thereby if the at least one connection element is charged with force during the movement of the seat occupant in such a manner that a movement of the lateral regions of the airbag to the interior is achieved by the connection element. In other words, the connection element draws the lateral regions of the airbag or of the support structure together, which increases the pressure build-up within the restraint volume. The described advantages result again with a support structure which can be deployed with gas and also with a mechanical solution.

It has further been shown to be advantageous if the at least one connection element extends in a central height region of the airbag. The bulging of for example the lateral regions of the airbag can hereby namely be prevented in a particularly effective manner, so as to altogether achieve a rather concave airbag shape in the regions of the airbag seen from the exterior. This is valid with a support structure which can be deployed with gas, and also with a mechanical solution.

In a further development of the invention, the at least one connection element is formed shorter than a width of the airbag. The desired concave airbag shape is again achieved hereby, and especially a bulging of for example the lateral regions of the airbag is prevented. This is valid with a support structure which can be deployed with gas, and also with a mechanical solution.

The connection element itself can be designed differently, namely either as a strand or a rope, a strap or however preferably as a planar surface element. It is apparent that the properties of the airbag can be optimized by the specific arrangement of the connection element.

The above-described advantages are also achieved by providing a connection element, which extends within the restraint volume of the airbag, and by which the restraint volume is divided into at least two segments. It is thus possible in a simple manner to impart a different deployment and restraint characteristic to different chambers or segments of the airbag. The restraint characteristic thereby mainly concerns a different damping action per segment, which can be adjusted correspondingly. It is possible to form for example the individual segments in such a manner that the pressure present therein can for example be adjusted to the body size and/or the body regions of the seat occupants to be restrained or to the function of the respective segment. This is valid with a support structure which can be deployed with gas, and also with a mechanical solution.

It has been shown to be particularly advantageous if the segments of the restraint volume of the airbag communicate with each other via respective connections. An air or gas exchange is possible, if necessary, to adjust desired properties of the airbag. It has however to be considered within the scope of the invention that the segments or chambers can also be separated completely from each other. Holes or leakages or even valves, especially check valves, are thereby suitable as respective connections between the individual segments. Corresponding flaps or other connections known to the expert are also conceivable.

In a further arrangement of the invention, it has additionally been shown to be advantageous if the restraint volume is divided into at least two segments by means of the connection element in the vertical direction (z direction) of the airbag or of the motor vehicle. By this segmentation, the restraint can for example be adjusted at different body regions as for example the head, the chest or the like and/or different occupant sizes. It has thus to be considered that the head impacts different airbag regions with different occupant sizes. This circumstance can be accommodated by the corresponding segmentation in the vertical direction.

In a further arrangement of the invention, it has additionally been shown to be advantageous if the restraint volume is divided into at least two segments by means of the connection element in the longitudinal direction (x direction) of the airbag or of the motor vehicle. The restraint can for example be adjusted for different occupant distances to the air bag or to the supporting surface of the airbag. The segmentation can additionally be used to adapt the deployment of the airbag to different occupant distances. By the division into several segments or chambers, the completely deployed segments or chambers can build up a corresponding pressure during the restraining effect, without its gas distributing into segments which are not yet deployed, and the corresponding restraining effect being lost thereby. Such an empty volume or such a leeway, which would be caused by a non-deployed segment, would namely have an extremely negative effect on the restraining effect. A further advantage of the segmentation of the restraint volume in the longitudinal direction (x direction) is that the airbag can be adapted to different accident severities or forward dislocations of the occupant. It is thus for example conceivable, with a driver or passenger airbag, to use the chamber which is at the front in the longitudinal vehicle direction, the last chamber as an emergency brake to protect the occupant in any case from an impact on the dashboard or the steering wheel.

In a further development of the invention it is additionally possible to divide the restraint volume by means of the volume element in the transverse (y) direction of the airbag or of the motor vehicle into at least two segments. It is in particular possible to adjust the restraint for different body regions as for example the head, the chest, the arms or the like. The segmentation can be advantageous for a diagonal impact, where the outer segments dampen for example in a stronger manner than the inner segments. Not least, the occupant kinematics can be influenced during a collision of the passenger motor vehicle. The different segmentations in the vertical direction, the longitudinal direction and the transverse direction of the airbag can naturally be combined in an arbitrary manner to optimize the occupant kinematics, the force distribution and the restraining effect with regard to the occupant.

It has additionally been shown to be advantageous in a further development of the invention if at least one additional restraint volume is provided, which is arranged outside the actual or main restraint volume. While the main restraint volume namely extends essentially behind the support surface for the occupant, the additional restraint volume shall in particular be arranged laterally thereof. The additional restraint volume can initially for example thus not be directly used for the restraint of the occupant, wherein this will become usable during the further course of the accident scenario, when a corresponding movement of the airbag or of the seat occupant relative to the airbag results namely by lateral impact of for example the arms, the knees or the legs of the occupant in the course of the forward dislocation. The restraint volume can thereby have an associated covering. It is additionally conceivable to extend or enlarge the covering of the airbag or of the support structure correspondingly by the restraint volume.

It has finally been shown to be advantageous if the airbag is designed in an essentially cuboidal manner. While a conventional airbag is designed in a spherical manner, it is especially possible by means of the support structure according to the invention to obtain a cube form. It is thus for example possible to maximize the effective surface during the immersion of the seat occupant from the start. This effect can also be achieved by a shape of the airbag which is adapted to the supporting surfaces. It is thus for example possible to let the form of the airbag follow the surface of the dashboard or the passenger side.

The same is also valid for an idealized assumed and average occupant contour.

Other objects, advantages and novel features of the present invention will become apparent from the following detailed description of the invention when considered in conjunction with the accompanying drawings.

DETAILED DESCRIPTION OF THE DRAWINGS

Figure 1:
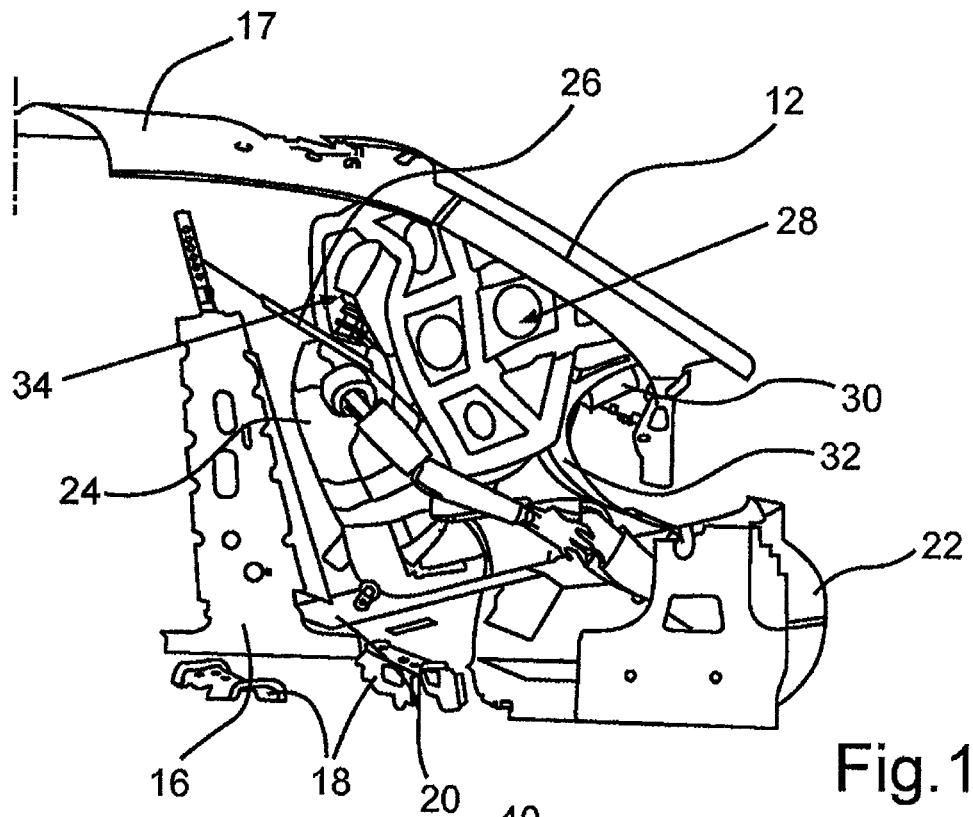
FIG. 1 is a partial schematic side view of a passenger cell of a passenger motor vehicle with an airbag with a support structure, which can be displaced from a storage position in an airbag module within a dashboard to a restraint position, as seen in FIG. 1, by means of a gas flow, and which comprises a plurality of hollow bodies connected to each other and forming a channel system, wherein a restraint volume is reproduced by the support structure in its restraint position, which is surrounded with a covering consisting of several surface elements, and wherein in FIG. 1 a seat occupant positioned on a passenger seat is shown dislocated forward due to a corresponding collision, in which he already immerses into the airbag.

FIG. 1 shows the passenger cell of a passenger motor vehicle in parts in a schematic side view. An A pillar 10 can thereby be seen in particular, which passes into a roof frame 12. Furthermore, a B pillar 16 and two transverse seat beams 18 can be seen, which extend between a center tunnel, not shown, and a side door sill, also not shown, or below a vehicle seat 20. On the body shell side, an end wall 22 can also be seen, which limits the passenger cell of the motor vehicle towards the front.

A seat occupant 24 sits on the passenger seat 20, who is fastened by means of a safety belt 26.

Furthermore, a passenger airbag 28 can be seen, which, due to a collision of the passenger motor vehicle, has been moved from a storage position, in which it is received in an airbag module 30 within the dashboard 32, to a restraint position shown in FIG. 1. The seat occupant 24 thereby already immerses into a support surface 34 of the airbag 28 which faces him. In other words, an advanced stage of the collision is already shown, in which the airbag 28 has been moved into is completely deployed or enlarged restraint position.

Figure 2:
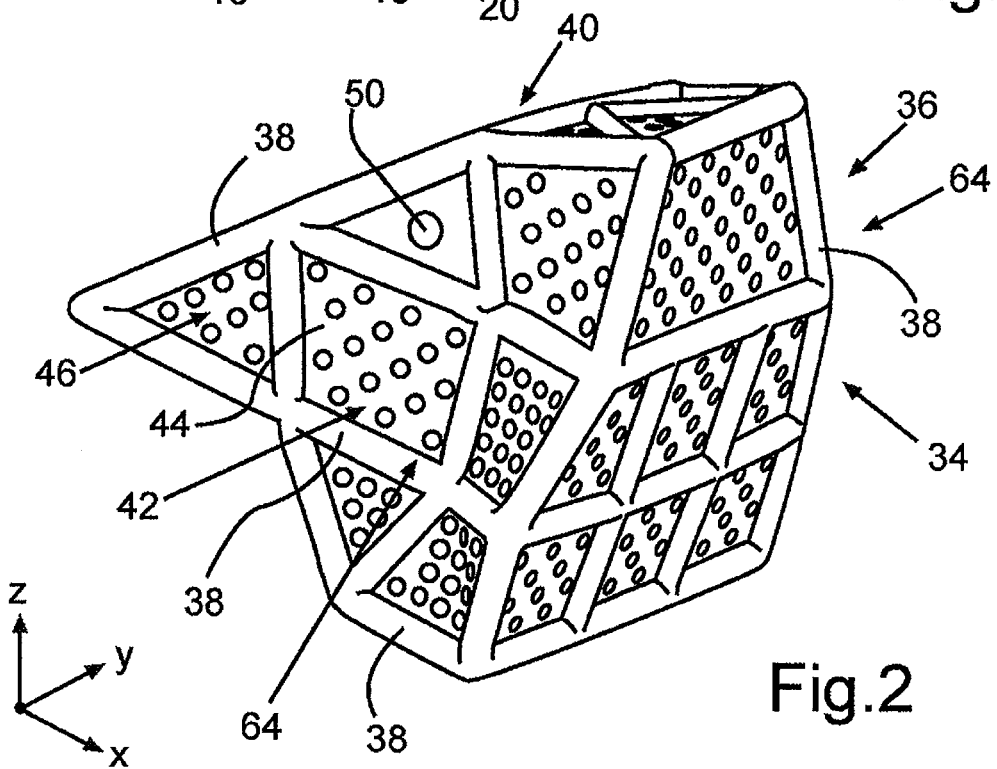
FIG. 2 is a perspective view of the airbag according to FIG. 1, with the support structure in the restraint position, which structure comprises a plurality of hollow bodies connected to each other, forming the channel system, and with the covering by means of which the restraint volume formed by the support structure is surrounded, wherein the covering of a plurality of compartments of the frame work-like or frame-like support structure is formed which fill surface elements.

FIG. 2 shows the airbag 28 in a perspective in this restraint position. Thereby, a support structure is visible in particular, which has been moved from the folded storage position to the restraint position by means of a gas flow. The support structure 36 comprises a plurality of hollow bodies 38 in the form of tubes or hoses for this, which are connected to each other to a channel system 40. The individual hollow bodies 38 are thereby in contact with each other in such a manner that they can be inflated together to a framework or a frame by a corresponding gas flow. The hollow bodies 38 consist of a flexible material.

Figure 4:
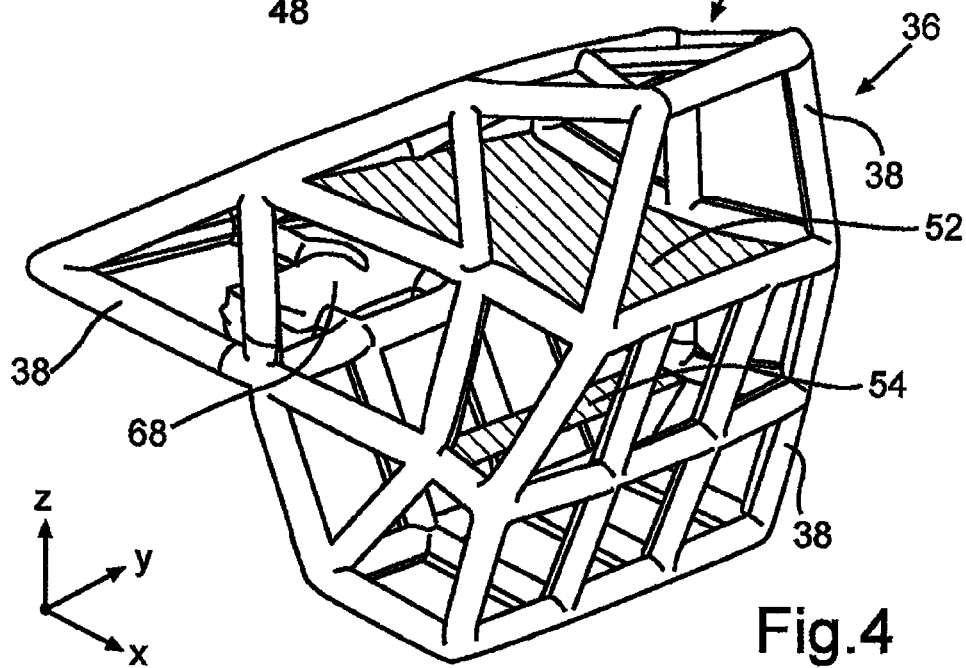
FIG. 4 is a further perspective view of the airbag according to FIGS. 2 and 3, wherein the surface elements which fill the compartments of the support structure are omitted in the covering of the restraint volume, whereby connection elements can be seen, which extend within the restraint volume and by means of which hollow bodies of the support structure and/or surface regions of the covering are connected to each other.

The support structure 36 is again shown separately in FIG. 4 in a perspective view analogous to the one according to FIG. 2.

Figure 3:
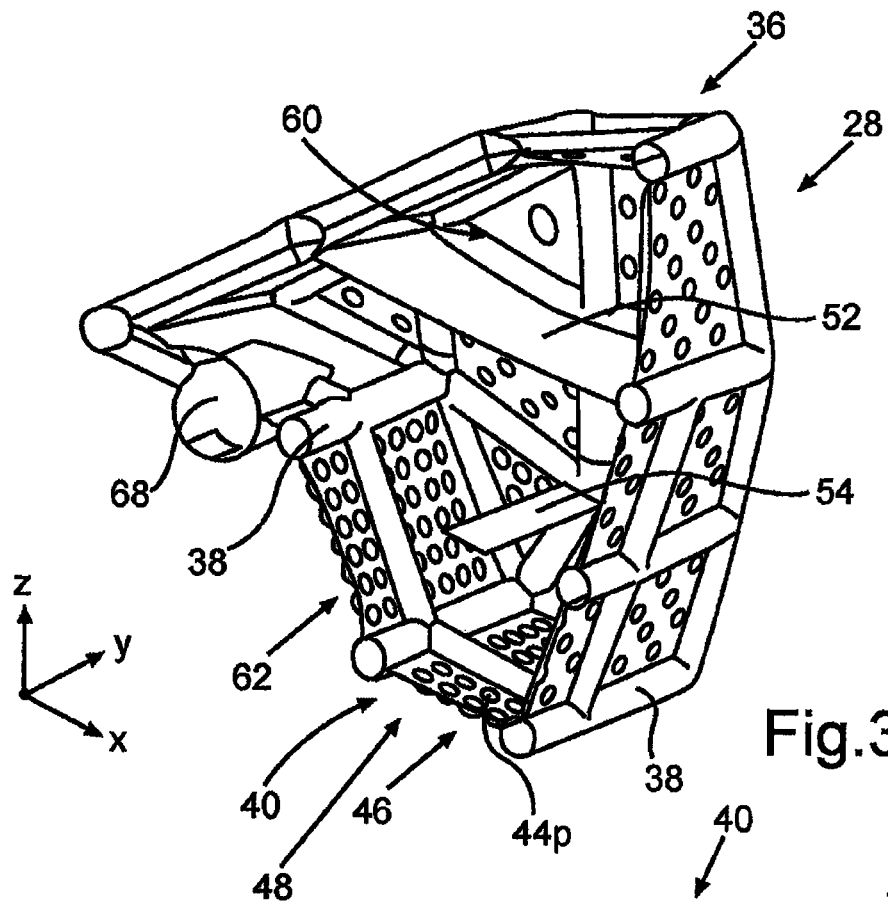
FIG. 3 is a sectional view through the airbag according to FIG. 2 along a sectional plane proceeding in the longitudinal vehicle direction (x direction) and in the vertical vehicle direction (z direction)

In synopsis with FIG. 3, which shows a sectional perspective of the airbag 28 along a sectional plane proceeding in the vertical direction (z direction) or in the longitudinal direction (x direction) of the airbag or of the motor vehicle, it can be seen that respective compartments 42 between the hollow bodies 38 are filled by respective surface elements 44 of a covering 46. In other words, the covering 46 is presently formed by the plurality of surface elements 44, which consist of a flexible material. A coherent covering 46 circulating on the outside or inside of the support structure would likewise naturally also be conceivable. A restraint volume 48 which is mounted by the support structure 36 is correspondingly surrounded or limited by means of this covering.

Ambient air can thereby flow in via suitable openings 50 within the covering 46 of the restraint volume 48. It would also be conceivable to let a gas flow flow into the restraint volume 48 or the covering 46 during the deployment of the airbag 28.

Altogether, it can be seen from FIGS. 1 to 4, that a restraint volume 48 is presently mounted especially by the support structure 36, which restraint volume is correspondingly limited by the covering 46. At the time of the impact of the occupant, the inner pressure within the restraint volume 48 is presently in principle rather lower than with a conventional airbag. This is especially so if ambient air is arranged within the restraint volume 48. The inner pressure for the restraint is mainly generated by the occupant himself during his forward dislocation during the course of the accident scenario, namely essentially by the volume reduction of the restraint volume 48 accompanying it. It is thereby of particular importance that this pressure build-up which is generated by the seat occupant for the restraint takes place as efficiently as possible.

For this reason, respective connection elements 52, 54, 56, 58 can be seen in synopsis with FIGS. 3 to 6, which connection elements extend within the respective restraint volume 48 of the airbag, and by means of which corresponding hollow bodies 38 and/or surface areas or surface elements 44 of the covering 46 are connected to each other.

In order to return first to FIGS. 3 and 4, the connection element 52 there is designed as a planar surface element, which divides the restraint volume 48 into two segments 60, 62. The connection element 54 is essentially formed as a strap, which connects respective lateral regions 64 of the airbag 28 or hollow bodies 38 arranged in this region. The connection element 54 thus presently proceeds approximately transversely to a deployment direction of the airbag 28, which is the longitudinal direction (x direction) of the airbag 28 or of the motor vehicle in the present case.

A bulging of the airbag 28 to its lateral regions 64 is thus reduced by the two connection elements 52, 54 with a corresponding impact—caused by a forward dislocation—of the seat occupant. A lateral evasion can thus mainly be reduced at the lateral regions 64, such that a corresponding pressure can build up within the covering 26 of the restraint volume 48 by the penetration of the seat occupant. As the connection elements 52, 54 are arranged in the central height region of the airbag 28, the bulging can be avoided in a particularly effective manner. The connection elements 52, 54 are additionally formed slightly shorter than the width of the airbag 28 between the two lateral regions 64 in a preferred manner, such that a concave airbag shape results, seen from the outside. The bulging in the lateral regions 64 during the immersion of the seat occupant 24 into the airbag can hereby be prevented in a particularly effective manner.

The forward dislocation of the occupant in the restraint volume 48 can be used as a special design in that he impacts the respective connection element 52, 54. The connection element 52, 54 thereby draws the bound lateral regions 64 together in an increased manner, which increases the pressure build-up of the restraint volume.

Figure 5:
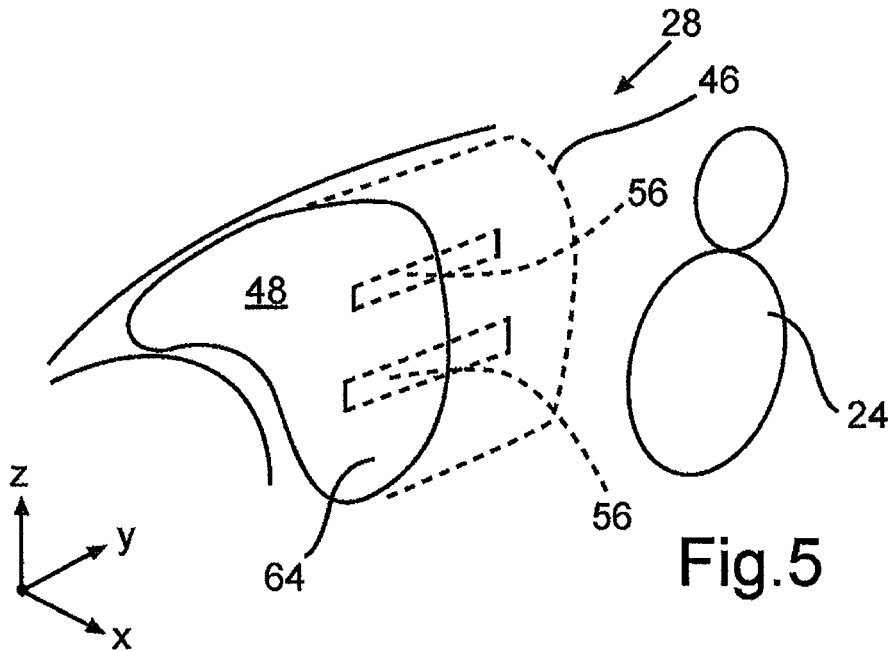
FIG. 5 is an extremely schematic perspective of the airbag in the restraint position, wherein two connection elements in the form of straps can be seen within the restraint volume.

FIG. 5 shows the airbag 28 in an extremely schematic perspective, in which two connection elements 56 extend within its restraint volume 48, and namely again between the respective lateral regions 64. The connection elements 56 are thereby designed as straps, which essentially extend in the vertical direction (z direction) of the airbag 28 or of the motor vehicle.

Figure 6:
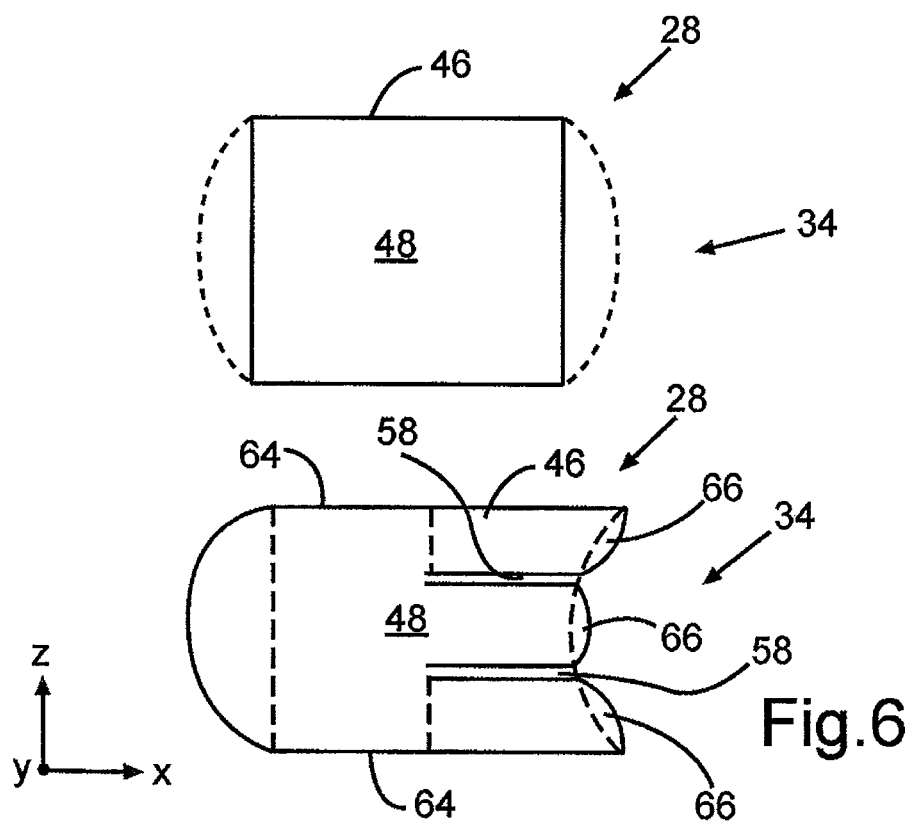
FIG. 6 is respectively a schematic side view of an airbag, wherein no connection element is provided in the upper case, and two connection elements extending in the longitudinal vehicle direction (x direction) are provided in the lower case, by means of which the deployment of the airbag is influenced.

FIG. 6 finally shows an airbag 28 in a schematic side view with corresponding connection elements 58 and one without corresponding connection elements. From the lower depiction in FIG. 6 it can be seen that the two connection elements 58 are arranged above each other in the vertical direction (z direction) of the airbag 28. While the support surface 34 of the airbag 28, which does not have any connection elements, which faces the seat occupant 22, is curved in a corresponding barrel shape, a corresponding contour of the support surface 34 can be provided with the airbag 28 with the connection elements 58, which surrounds the seat occupant in an arched manner. Hereby, a particularly advantageous restraint function results for example. Between the connection elements 58, a slight bulging 66 can however be achieved, for example to receive the seat occupant 24 in a corresponding manner.

From FIGS. 3 and 4, a gas generator 68 can finally be seen, by means of which in particular the hollow bodies 38 of the support structure 36 are to be filled or to be deployed.

Figure 7:
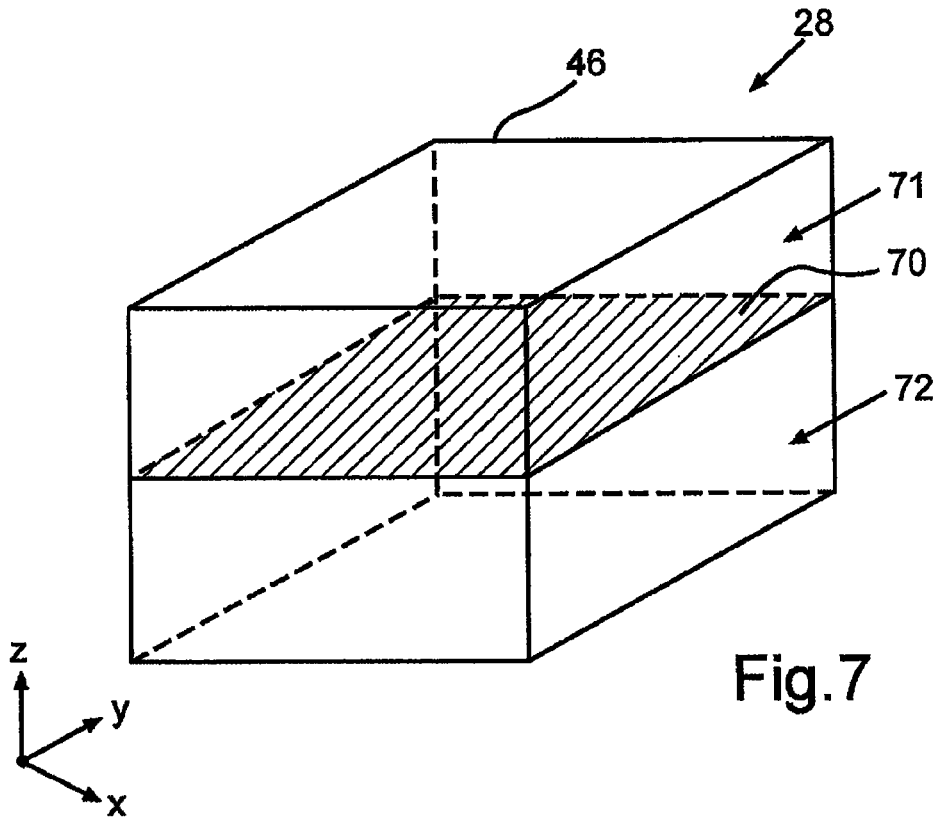
FIG. 7 is only a schematic representation of an essentially cuboidal airbag in principle with an associated restraint volume, wherein a connection element designed as a surface element is provided within the restraint volume, by means of which the restraint volume is divided into two segments in the vertical direction (z direction) of the airbag or of the motor vehicle.
Figure 8:
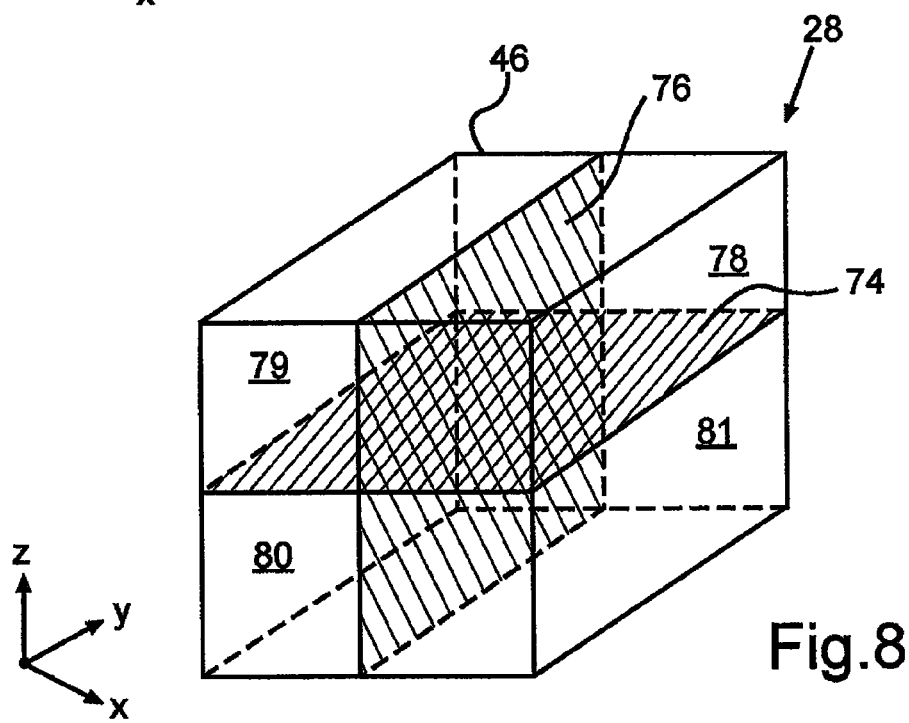
FIG. 8 is a further schematic representation in principle of the essentially cuboidal airbag in its restraint position, wherein again two connection elements are provided within the restraint volume of the airbag, which divide the restraint volume in the longitudinal direction (x direction) and in the vertical direction (z direction) of the airbag or of the motor vehicle.

FIGS. 7 and 8 finally show two essentially cuboidal airbags 28 in an extremely schematic manner, which again have an analogous construction as the ones according to FIGS. 1 to 4.

In FIG. 7, a connection element 70 which is designed as a surface element can be seen in particular, by means of which the restraint volume 48 of the airbag is divided in two segments 71, 72 in the vertical direction (z direction). This division corresponds insofar to the one of the connection element 52 in FIGS. 3 and 4. By such a segmentation in the vertical direction (z direction), the restraint can for example be adjusted for different body regions as for example the head, the chest or the like and/or different occupant sizes.

FIG. 8 however shows an airbag 28, whose restraint volume 48 is respectively divided into two segments by means of respective connection elements 74, 76 into the vertical direction (z direction) and into the longitudinal direction (x direction) of the airbag 28 or of the motor vehicle. Four segments 78, 79, 80, 81 presently result. By the additional segmentation in the longitudinal direction (x direction) taking place with the embodiment according to FIG. 8, the restraint can for example be adjusted for different occupant distances to the airbag 28 or to the support surface 34. The segmentation can additionally be used in that the airbag 28 adapts to different occupant distances in its deployment.

It is apparent that the segmentations which are present here can be correspondingly combined with each other, and that the connection elements 70, 72 according to FIGS. 7 and 8 are also correspondingly arranged at the support structure 36 and/or the covering 48. It is thus in particular possible by means of the segmentation to create different chambers with different pressures, so as to achieve corresponding properties of the airbag 28.

Figure 9:
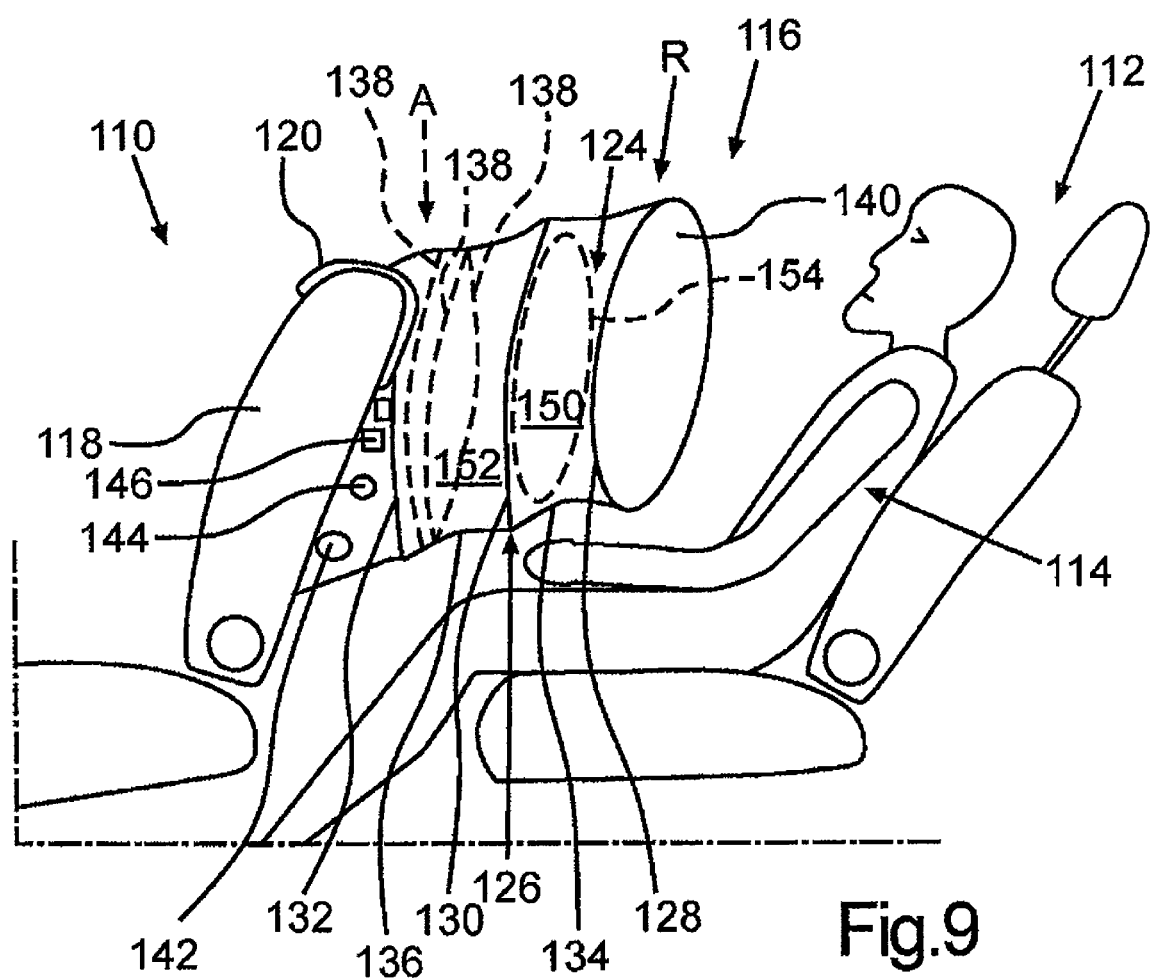
FIG. 9 is a schematic side view of an airbag positioned between two vehicle seats arranged behind each other according to a further embodiment of the invention, which in particular comprises a mechanical support structure with a plurality of rod elements, tubes, ledges or the like, which are respectively connected to each other via a plurality of spring elements.

In FIG. 9 can be seen two vehicle seats 110, 112 arranged behind each other in a schematic side view. The two vehicle seats 110, 112 can respectively be associated with a front and back seat row of a passenger motor vehicle. The two vehicle seats 110, 112 can alternatively also arranged in another motor vehicle or a bus, and within a train compartment. The two seats 110, 112 can also be positioned with the cabin of an aircraft.

It can be seen that an occupant 114 is present on the back vehicle seat 112. An airbag 116 is associated with this seat occupant 114, which airbag is presently positioned at the back side of a backrest 118 for example by means of a releasable holding device 120. It is especially naturally also conceivable to use such an airbag 116 as a driver or passenger airbag.

The airbag 116 comprises a restraint volume 124 limited by a covering 140, which volume is presently shown in an enlarged or deployed restraint position R.

In order to achieve this restraint position R, the airbag 116 comprises a mechanical support structure 126, which presently comprises a plurality of components—circular rod elements 128, 130, 132 here, tubes, ledges or the like. The rod elements 128, 130, 132 are presently connected to one another via respectively a plurality of spring elements 134, 136. Alternatively, it would also be conceivable to for example use a large spiral spring or the like as the mechanical support structure. It has to be considered within the scope of the invention that other combinations of spring and/or rod elements are also conceivable.

The support structure 126 can be enlarged or extended from a storage position A shown with dashed lines to the restraint position R shown with drawn out lines by these spring elements 134, 136. In other words, a mechanical device in the form of the support structure 126 is presently created, by which the restraint volume 124 can be enlarged or adjusted from the storage position A to the restraint position R. This takes place by the suitable combination of rod elements 128, 130, 132 or the like and spring elements 134, 136 or the like. Alternatively, at least one spiral spring can be provided in one embodiment, which combines the function of the rod and spring elements. Such a function is for example given with a revolving spiral or helical spring.

The support structure 126 is mounted or covered by the covering 140, which itself is essentially formed in such a manner that an inflow of a gas, especially air, enables that an outflow of the enclosed gas, especially the enclosed air, is for example possible only in a decelerated manner. In other words, the covering 140 is formed in such a manner that the enlarged restraint volume 124 can be received therein.

This restraint volume 124 is formed by covered ambient air in the present case, which is received in the space limited by the covering 140 during the deployment or enlarging by means of the support structure 126. It is thereby for example conceivable that the ambient air can be correspondingly taken in, enclosed or surrounded during the deployment or enlarging of the support structure 126. In the present embodiment, an inlet opening 142 is provided for this for example, via which ambient air can reach the interior of the covering 140. This takes place in that a low pressure results during the extension of the support structure 126 within the covering 140, via which ambient air is taken in accordingly. An enclosure or another surrounding of ambient air would naturally also be conceivable here. The inlet opening 142 can for example also contain a check valve and/or serve as an outflow opening.

The airbag 116 presently serves indirectly for restraining the person 114 for example during an accident or impact. In this case, it is achieved by the enlarging of the restraint volume 124 in the restraint position R, that the seat occupant 114 can immerse correspondingly into the airbag 116. By the internal pressure of the restraint volume 124 or the ambient air within the covering 140, an energy absorption or damping of the movement of the seat occupants 114 is achieved in the forward direction, which this traverses during a corresponding collision or a corresponding impact. The support structure 126 is thereby formed resiliently in such a manner especially by the spring elements 134, 136, that the restraint system 116 can deploy its restraint effect. The support structure 126 can possibly contribute to the restraint of the person 114 within certain limits.

Altogether, it can thus be seen in FIG. 1, that a separation between the deployment or enlarging function on the one hand and the restraint function on the other hand is presently created. The deployment or enlarging function is essentially achieved by the support structure 126, wherein a corresponding extension of the support structure 126 in the backward direction and towards the seat occupant 114 is achieved by the spring elements 134, 136. The restraint function of the airbag 116 is however—at least essentially—achieved by the restraint volume 124 limited by the covering 140, which has previously been enlarged correspondingly by means of the support structure 126. The inertia of the restraint volume or presently of the ambient air within the covering is utilized thereby.

At least one outlet opening 144 can be provided within the covering 140, via which ambient air can flow out or be let out from the covering 140, if the seat occupant impacts the restraint system. The damping or energy absorption of the airbag 116 can thus be adjusted in a simple manner. The at least one outlet opening 144 can be provided with a closure, which opens when a certain load is exceeded, for example a certain internal pressure. The opening can be reversible, for example by a spring-loaded or a resilient flap. An irreversible formation of the closure is also conceivable, for example in the form of a bursting membrane or the like. A practically unlimited holding time of the restraint volume 124 is thereby achieved by the closure without having to forego the important damping by the outflow opening 144. This outflow is e.g., opened by an impact or an impingement of the seat occupant/user on the airbag 116.

Especially in connection with an airbag 116, which can be mounted manually by the user from the storage position or the storage extension to the restraint position or restraint extension, the advantage results, for example in an aircraft, that a possibly remaining restraint volume 124 can be pressed together slightly during an evacuation, rescue or the like, so as to avoid an impediment. An easy storage is thus also ensured. Spring elements or rod elements can hereby be foregone for example. One or several mounted surfaces can be advantageous for easy mounting. However, these are not coercively necessary. Loops or the like can serve for the mounting, which possibly can also serve for fastening to the safety belt or similar.

The present airbag 116 can for example comprise a unit 146, only indicated schematically, for communication with a prediction system for example on the motor vehicle side, wherein an imminent impact or a collision of the motor vehicle or the like can be detected by means of the prediction system. The restraint system 116 can thus be prematurely enlarged or deployed to the restraint position R, so that this is in place prematurely, prior to the impact. An arbitrary holding time is thereby possible by the support structure 126, without the restraint volume 124 reducing essentially. A slow and harmless deployment of the restraint system 116 is thus possible by means of the support structure 126. A forward-looking sensing of imminent accidents can thus correspondingly be realized by the airbag 116, so as to offer a corresponding restraint to the person to be protected.

Such a forward-looking sensing of the restraint system 16 can be used not only with motor vehicles, buses or trains, but rather also with shipping, air or space travel.

From FIG. 9, a connection element 154 can again be seen schematically, which extend within the restraint volume 124 of the airbag and by means of which corresponding mechanical components (rod elements 128, 130, 132 or spring elements 134, 136) and/or surface regions or surface elements of the covering 140 are connected to each other.

With regard to the concrete arrangement of the connection element(s) 154, we hereby refer to the embodiments according to FIGS. 1 to 8. The connection element 154 can again be designed as a planar surface element, which divides the restraint volume 124 into several segments 150, 152. The connection element 154 can additionally essentially be formed as a strap, which connects respective lateral regions of the airbag 116 or the mechanical components (rod elements 128, 130, 132 or spring elements 134, 136) arranged in this region. The connection element 154 thus presently proceeds approximately transversely to a deployment direction of the airbag 116, which is the longitudinal direction (x direction) of the airbag 116 or of the motor vehicle in the present case.

A bulging of the airbag 116 in its lateral regions is thereby reduced by the respective connection element 154 during a corresponding impact—caused by a forward dislocation—of the seat occupant, so that a corresponding pressure can build up within the covering 140 of the restraint volume 124 by means of the immersion of the seat occupant. The connection element 154 can also be formed slightly shorter than the width of the airbag 116, so that a concave airbag form results, seen from the outside. The bulging in the lateral regions during the immersion of the seat occupant 114 can hereby be prevented in a particularly effective manner.

The forward dislocation of the occupant 114 in the restraint volume 124 can again be used in a special arrangement of the invention, so that he impinges the respective connection element 154. The connection element 154 thereby increasingly draws the bound lateral regions together, which increases the pressure build-up of the restraint volume.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. An airbag for a motor vehicle, said airbag comprising;
   a support structure displaceable from a storage position to a restraint position;
   a covering, which surrounds a restraint volume of the airbag formed by the support structure, in its restraint position; and
   at least one connection element extending within the restraint volume which at least one connection element interconnects at least one of components of the support structure and/or surface regions of the covering, wherein the at least one connection element is a planar surface element arranged in a direction transverse to a direction between a passenger of the motor vehicle and a front of the motor vehicle,
   wherein the support structure is a mechanical support structure, by which the airbag can be displaced from the storage position to the restraint position, wherein the mechanical support structure comprises a plurality of circular rod elements connected to each other via a spring element.

2. An airbag for a motor vehicle, said airbag comprising:
a support structure displaceable from a storage position to a restraint position, the support structure comprising a channel system of at least a plurality of hollow bodies, which in the restraint position extend in a direction between a passenger of the motor vehicle and a front of the motor vehicle;
a covering, which surrounds a restraint volume of the airbag formed by the support structure, in its restraint position; and
at least one connection element extending within the restraint volume which at least one connection element interconnects at least one of components of the support structure and/or surface regions of the covering,
wherein said at least one connection element divides the restraint volume of the airbag into at least two segments,
wherein the connection element divides the restraint volume into at least two segments in a transverse direction of the airbag, and
wherein a different pressure is present in the restraint position of the airbag within the at least two segments.

* * * * *